(12) United States Patent
Yi (10) Patent No.: US 6,704,652 B2
(45) Date of Patent: Mar. 9, 2004

(54) REAL TIME SELF DIFFERENTIAL GLOBAL POSITIONING SYSTEM AND METHOD FOR A MOVING STATION IN A LOCAL AREA, AND TERMINAL GLOBAL POSITIONING SYSTEM USING THE SAME

(75) Inventor: Dong Hyuk Yi, Busan (KR)

(73) Assignee: Total Soft Bank Ltd., Busan (KR)

( * ) Notice: Subject to any disclaimer, the term of this patent is extended or adjusted under 35 U.S.C. 154(b) by 2 days.

(21) Appl. No.: 10/131,385

(22) Filed: Apr. 25, 2002

(65) Prior Publication Data

US 2003/0083817 A1 May 1, 2003

(30) Foreign Application Priority Data

Oct. 29, 2001 (KR) .................................... 10-2001-66711

(51) Int. Cl.[7] .............................................. H04B 7/185
(52) U.S. Cl. .................. 701/214; 701/215; 342/357.02; 342/357.03; 342/357.09; 342/357.1; 342/358
(58) Field of Search ................................. 701/214, 215; 372/357.02, 357.03, 357.09, 357.1, 358

(56) References Cited

U.S. PATENT DOCUMENTS

| | | | | | |
|---|---|---|---|---|---|
| 5,646,630 A | * | 7/1997 | Sheynblat et al. | ..... | 342/357.14 |
| 6,118,977 A | * | 9/2000 | Vannucci | ................... | 455/12.1 |
| 6,229,478 B1 | * | 5/2001 | Biacs et al. | ............ | 342/357.03 |
| 6,236,359 B1 | * | 5/2001 | Watters et al. | ........... | 342/357.1 |
| 6,249,245 B1 | * | 6/2001 | Watters et al. | ......... | 342/357.03 |
| 6,256,475 B1 | * | 7/2001 | Vannucci | ................... | 455/12.1 |
| 6,271,788 B1 | * | 8/2001 | Longaker et al. | ....... | 342/357.03 |
| 6,567,041 B1 | * | 5/2003 | O'Dell | .................. | 342/357.03 |

\* cited by examiner

Primary Examiner—Jacques H. Louis-Jacques
Assistant Examiner—Eric Gibson
(74) Attorney, Agent, or Firm—GWiPS (57) ABSTRACT

A terminal Global Positioning System (TGPS) adopting a real-time self Differential Global Positioning System (DGPS) is developed for positioning a moving station in a local area. This TGPS enables not only to minimize the error ranges without any additional expensive transmitting-receiving equipment, but also to calculate an accurate correcting value through a TGPS server. A method of TGPS adopting the real-time self DGPS comprises the steps of: (1) receiving a GPS signal from the moving station containing data of satellite time and pre-measured moving station position, (2) receiving the reference station GPS signals at the TGPS server (3) calculating a correcting value from the moving station at the central control server, (4) calculating an error-corrected real position of the moving station according to the correcting value and position data of moving station at the central server, and (5) positioning the moving station accurately according to the correcting value and the GPS signal of the moving station at the central control server.

1 Claim, 6 Drawing Sheets

REAL TIME SELF DIFFERENTIAL GLOBAL POSITIONING SYSTEM AND METHOD FOR A MOVING STATION IN A LOCAL AREA, AND TERMINAL GLOBAL POSITIONING SYSTEM USING THE SAME

BACKGROUND OF THE INVENTION

1. Field of the Invention

The present invention relates to a Global Positioning System (GPS) and a method for a moving station in a local area. More particularly, this GPS system relates to the technology of a real-time self Differential Global Positioning System (DGPS) and a method for accurately positioning a moving station that is located within a radius of several kilometers, and applying the technology to an industrial terminal operation.

2. Description of the Prior Art

In recent decades, many cutting edge technologies have been competitively developed to lead the world markets. One of these technologies is the Global Positioning System (GPS) and Method that is able to determine a three-dimensional position and time anywhere on or near the surface of the Earth for a moving station. The GPS system employing at least four satellites is able to position a moving station by receiving satellite-based navigational data of location, speed and time through receivers. However, the conventional system has a wide error margin of approximately 100 meters, which is not acceptable in reality. The large margin of error is due to the GPS (non-military GPS) orbit, delay from passing through the Ionosphere and Troposphere and Selective Availability (SA).

Figure 1:
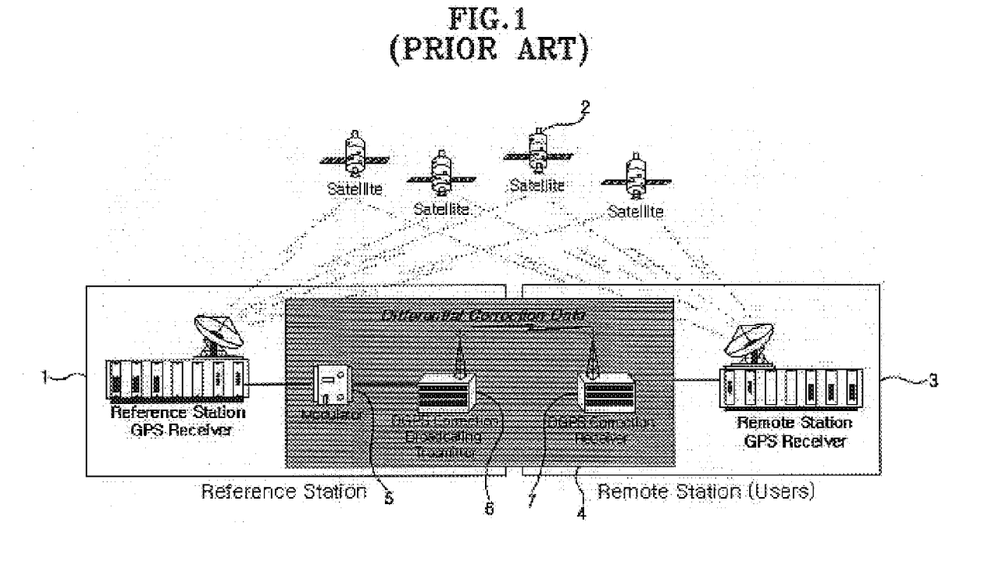
FIG. 1 is a system configuration drawing illustrating a conventional Differential Global Positioning Systems (DGPS).

Many sources of error can be compensated for by using a Differential GPS (DGPS) system, which can improve accuracy to within about 5 meters. As shown in FIG. 1, a typical configuration of a conventional DGPS system illustrates a navigation system capable of positioning a client through the following process: a reference station of known position, (1) calculates an error range in a pseudo distance according to the data received from a satellite, (2) transmits the calculated error range to the nearby user, and (3) determines the real position. Next, (4) the DGPS system broadcasts the correcting message via a broadcasting system. The correcting message for correcting a position error is calculated according to the instantaneous comparison of the pre-measured position at the reference station with the calculated position according to the received GPS signals. For broadcasting the correcting message, the correcting message is transformed to a standard format of Radio Technical Commission for Maritime Services (RTCM). The transformed correcting message is modulated to the ultrahigh frequency by a modulator (5), transmitted through a transmitter (6), and received through a receiver (7) for reflecting on the calculation of the positions.

The errors contained in the GPS signals (i.e., errors caused from the GPS satellite orbit, GPS satellite time, delay of Ionosphere and Troposphere when the GPS signals pass through these layers, interference of multi-channel and receiver noise) are considered as common errors between the reference station and the user, excepting the interference of multi-channel error and receiver noise error. In order to avoid or minimize these sorts of errors, a process is adopted based on the theory of decay.

Moreover, the published Korean Patent Application No. 1999-15845 and the registered Korean Patent No. 260253, disclose that: the benefits of the error compensation performed by DGPS decrease or disappear entirely as the distance between the DGPS reference station and the user increases (normally more than 100 Km), because the common errors have the characteristics of decay. To reduce or limit the occurrence of common errors, a plurality of reference stations must be established. A technique of minimizing error range is developed by properly modifying an error correction being calculated by more than 2 reference stations within a certain distance.

Figure 2:
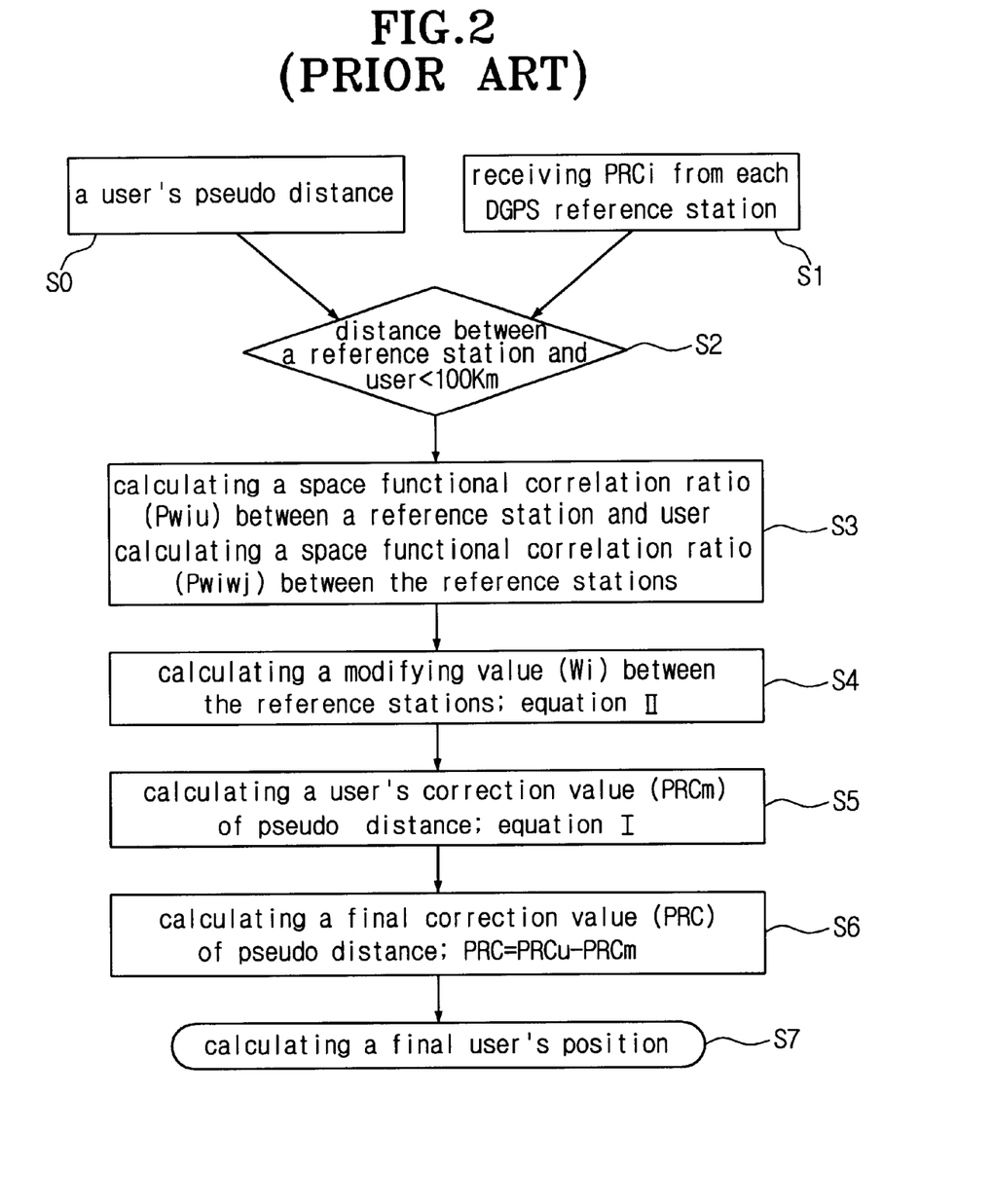
FIG. 2 is a flow chart of conventional Differential Global Positioning Systems (DGPS) applied to a plurality of reference stations.

As shown in FIG. 2, a flow chart of the conventional DGPS performance is presented for positioning a client by adopting a plurality of reference stations. In step S0, user's pseudo distance including error is determined according to the GPS signals. In step S1, the correction values of pseudo distance (PRCi) are received from each DGPS reference station. In step S2, among the received correction values of pseudo distances between the reference stations and users, only those values received from within 100 Kilometers are selected, and the rest of the correction values are discarded. In step S3, calculate a space functional correlation ratio (Pwiu) between a reference station and user and a space functional correlation ratio (Pwiwj) between the reference stations. Step S4 determines a modifying value (Wi) for applying to the error correction from the i-th reference station. Step S5 calculates the user's correction value (PRCm) of pseudo distance according to the modifying value (Wi) determined in the previous step 4 and the correction value of pseudo distance (PRCi) received from each reference station. Step S6 accurately calculates a final correction value (PRC) of pseudo distance by adding or subtracting the correction value of each reference station to the user's correction value of the pseudo distance calculated from each DGPS receiver. Step 7 determines an accurate final user's position according to the final correction value (PRC) and the user's pseudo distance (including error) determined from the GPS signal (S0).

Application of the DGPS system requires installing expensive DGPS receivers and additional transmitting equipment. Therefore, this system is not suitable to operate a plurality of moving stations due to the requirement of installing the expensive equipment. Another system of Post Processing DGPS data has been suggested to reduce the errors and operating cost. However, this system has difficulty to apply to real time DGPS.

SUMMARY OF THE INVENTION

In order to overcome the problems of the conventional GPS and DGPS as discussed above, a unique real-time self-Differential Global Positioning System (DGPS) of the present invention is developed for positioning moving stations in real time through a wireless modem within a local area with a radius of several kilometers (desirably in the range of 1~2 Kilometers). This new system enables not only to calculate, transmit and receive the correcting values via only the GPS receiver, but also to reduce error ranges to several decimeters or several centimeters, which is the same level as the DGPS, without necessitating additional equipment.

The real-time self DGPS system for a moving station is operated under the circumstance that a client communicates to a server through a wireless LAN network in a local area. The real-time self DGPS system comprises: a private reference station (10) which has had its position predetermined by an accurate measurement and includes a reference station GPS receiver (11) for positioning via satellites.

A moving station (30) includes a moving station GPS receiver (31) for detecting position via satellites and a first wireless modem (32) for transmitting RGPS (real time GPS)? signals. The RGPS signals contain the position data and satellite time data. The moving station GPS receiver (31) is connected to the first wireless modem (32) to transmit the signals.

A central control unit (40) comprises a terminal GPS (TGPS) server(41), a central control server (42) and a second wireless modem (43). The second wireless modem (43) is connected to the first wireless modem (32) of the moving station (30) for communicating with each other over a relatively short distance.

The TGPS server (41) is interfaced with the reference station GPS receiver (11) to receive the RGPS signals from the reference station. The TGPS server (41) calculates correction data (X'0, Y'0) from the received data and transmits the calculated correction data to a central control server (42).

The central control server (42) interfaces with the second wireless modem (43) which receives the RGPS signals from the moving station. The central control server (42) calculates the real position of the moving station by correcting the error from the position RGPS signals received from the moving station. The position data is transformed to the coordinate values of the local area. The local area is defined within a radius of several kilometers.

An industrial Terminal Global Positioning System (TGPS) employing a real-time self DGPS in a local area comprises: the position data being received through the existing wireless modem used for controlling and manipulating job control data of the moving station without any additional transmitting-receiving equipment. The code of the position data and job control data is composed of a string including a distinguishing header.

A method of real-time self DGPS comprises the processing steps of: (S10) at a specific moment, the central control server (42) receives a moving station GPS signal (Mgps_0) containing the data of satellite time (To) and moving station position (Xm0, Ym0) measured by a moving station GPS receiver (MGPS) (31); (S12)The received data of satellite time (To) of the moving station GPS signal is transmitted to a TGPS server (41)); (S13) receiving the reference station GPS signal (Rgps_−2, Rgps_−1, Rgps_0, Rgps_1, Rgps_2) containing satellite time (To) data and position data (Xr, Yr) being measured by the reference station GPS (RGPS) receiver (11) located at the private reference station (10) close to the satellite time (To) in TGPS server (41); (S14) selecting a position data (Xr0, Yr0) of the reference station GPS signal corresponding to the satellite time (To); (S20) calculating a correcting value (X'0, Y'0) according to the selected reference station GPS signal (Rgps_0) and the stored actual position data (Xs, Ys) of the reference station; and (S24) calculating an error-corrected actual position data (Xcm0, Ycm0) of the moving station according to the correcting value and the position data of the moving station.

Generally, the error ranges of the conventional GPS and DGPS systems are in proportion to the distance between the reference stations. To increase the accuracy of a DGPS system, the error must be reduced to an acceptable range of several decimeters or several centimeters. To do so, the additional equipment required for modifying the conventional GPS or DGPS system is costly.

On the other hand, the DGPS system of the present invention establishes a private reference station within a several kilometers radius in a relatively narrow local area. Through the existing wireless modems used for controlling and governing, the new DGPS system enables to transmit-receive a correcting value for GPS signals to accurately position the moving stations and reduce the error range without installing any expensive equipment.

Most GPS signal data measured by the conventional technique contains wide and irregular error ranges if the instant when a moving station needs a correcting value is different from the instant when a server transmits the correcting value. Thus, the conventional technique is not reliable because the error range is wide and irregular every time.

Even though the moments of requesting and receiving the correcting value for GPS signal data may be different, the technique of the new DGPS system enables to accurately calculate the correcting values and track the trajectories of the moving stations by using a log and satellite time data transmitted when the moving station requests the correcting value via the TGPS server.

DETAILED DESCRIPTION OF THE PREFERRED EMBODIMENT

A unique real-time self Differential Global Positioning System (DGPS) for a moving station of the present invention is developed in order to overcome the problems of conventional GPS and DGPS systems as discussed above. The new DGPS system is capable of calculating, transmitting and receiving the correction values by using only the GPS receiver without any additional equipment. The new DGPS system can also accurately position moving stations in real time through a wireless modem within a radius of several kilometers in a local area. The error range is reduced to several decimeters or several centimeters.

The detailed description is presented accompanied by FIG. 3 through FIG. 6.

Figure 3:
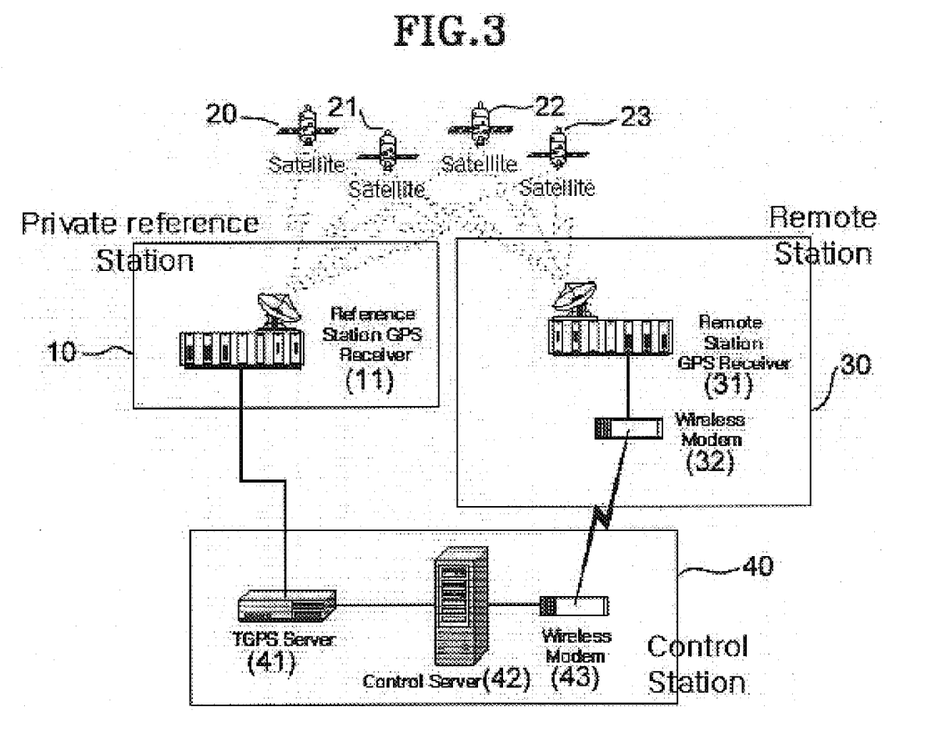
FIG. 3 is a system configuration drawing illustrating a real time self differential global positioning system (DGPS) of the present invention.

As shown in FIG. 3, a real-time self DGPS system for a moving station and TGPS adopting the real-time self DGPS system is composed of the GPS satellites (20~23), a private reference station (10), a moving station (30) and a central control unit (40).

The private reference station (10) which is established at an accurately pre-measured position has the function of receiving data from the satellites (20~23), calculating an error range in a pseudo distance and transmitting the calculated error range to the TGPS server. The conventional DGPS reference station is usually equipped with a huge transmitting and receiving facility to cover several hundred kilometers of broadcasting. Compared to the conventional DGPS, the private reference station (10) consists of only a reference station GPS receiver (11) for detecting position via satellites. The TGPS system is also equipped with a GPS receiver (11), which is the same as the reference station GPS receiver (11), for accurately detecting position via satellites. Generally, more than one private reference stations are established in a radius of 2 Kilometers.

A moving station (30) includes a moving station GPS receiver (31) for detecting position via satellites (20~23) and a first wireless modem (32) being used for transmitting GPS signals which contain the position data and satellite time data. The transmitting speed of the wireless modems affects the accuracy of the real time positioning.

A central control unit (40) includes a TGPS server (41), a central control server (42) and a second wireless modem (43). The second wireless modem (43) communicates with the first wireless modem (32) over a relatively short distance. The TGPS server (41) (or PC) is interfaced with the reference station GPS receiver (11) for sequentially receiving the GPS signals, calculating correction data (X'0, Y'0) from the received signals and transmitting the calculated correction data to a central control server (42). The GPS signal data is stored in the central control unit (40), private reference station (10) or any other storing unit in the system on the basis of the satellite time. However, the data must be transmitted or received through the exclusive line for prompt communication.

The central control server (42) transmits only the satellite time data among the GPS signals received from the moving station (30) to the TGPS server (41). Then, the TGPS server (41) compares the received GPS satellite time with the stored GPS signal of the reference station for selecting a corresponding reference station GPS signal. The position data of the selected GPS signal is transformed to a coordinate value. The transformed coordinate value is compared with the precisely coordinated values of the pre-measured reference station. The difference between the transformed coordinate value and the pre-measured coordinate value is a correction value.

Next, the TGPS server (41) transmits the correcting values to the central control server (42). At the central control server (42), the position data of the stored reference station GPS signals are transformed to a coordinate value. The final corrected position of the moving station is calculated from the difference of the coordinate values between the stored position data and the transmitted correcting values.

The central control server (42) interfaces with the second wireless modem (43) to receive the GPS signals from the moving station, and to calculate the real time position of the moving station by using correcting values from the position data received from the GPS moving station.

An industrial terminal Global Positioning System (TGPS) may employ the real-time self-Differential Global Positioning System (DGPS). In the TGPS system, the central control server (42) also has the function of job control server. This means that the TGPS is operated as a networkclient in a terminal operating site without an on-site server. The position data is received via the existing wireless modem to control and govern the job control data of the moving station without any additional transmitting-receiving equipment. The position data and job control data comprise a string and distinguishing header.

Figure 4:
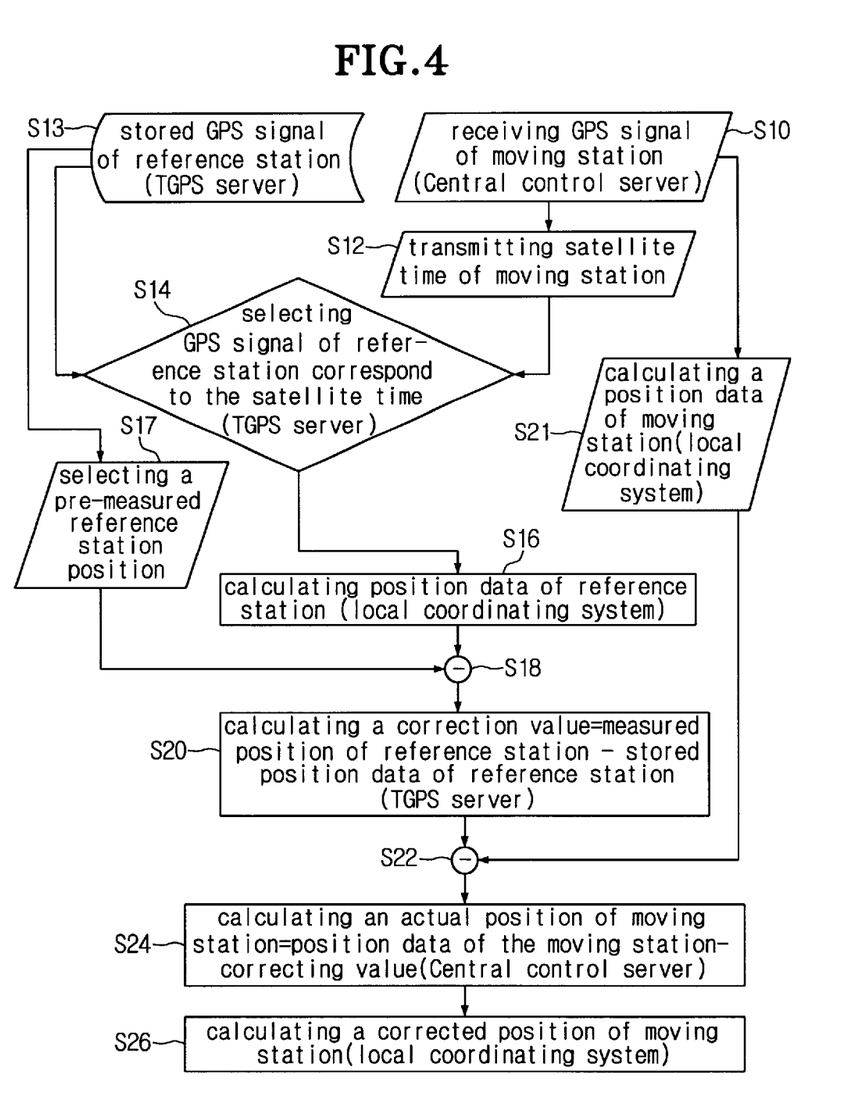
FIG. 4 is a flow chart of the real time self differential global positioning system (DGPS) of the present invention.
Figure 5:
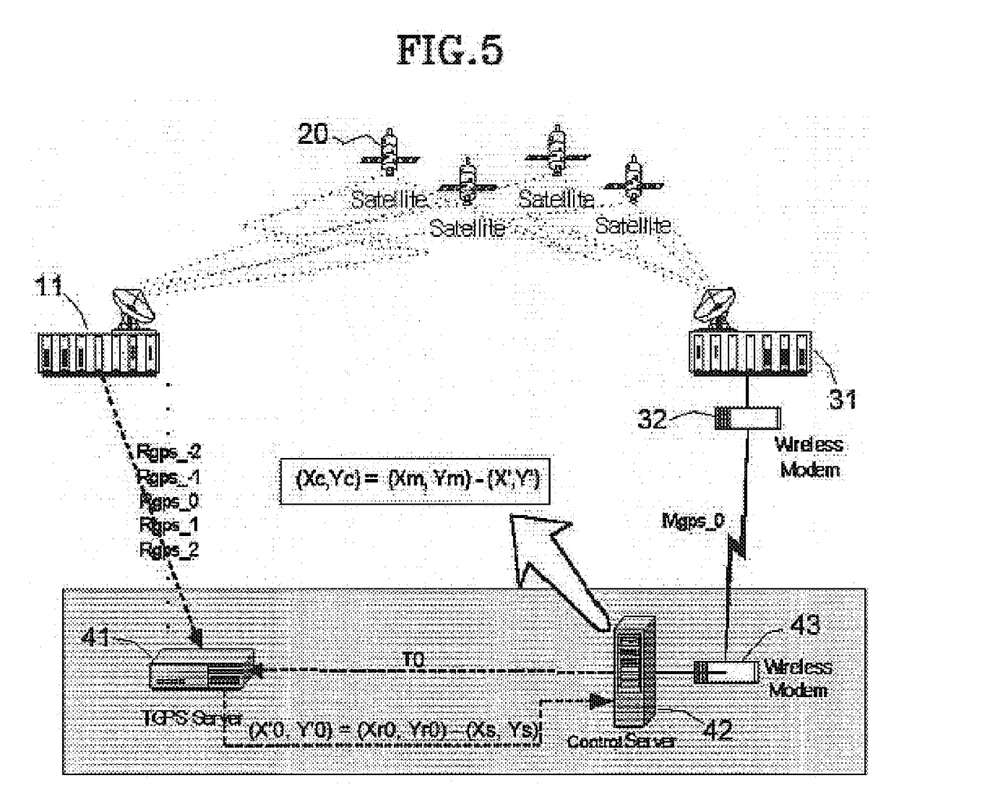
FIG. 5 is a data flow model of the real time self differential global positioning system (DGPS) of the present invention.

As shown in FIGS. 4 and 5, a method of processing data for real-time self DGPS in a local area comprises eleven steps.

In step S10, the central control server (42) receives a GPS signal (Mgps_0) from the moving station containing the data of satellite time (T0) and moving station position (Xm0, Ym0) being measured by a moving station GPS receiver (MGPS) (31) at a specific position and time.

In step S12, the data of satellite time (To) from the moving station GPS signal is transmitted to the TGPS server (41).

In step S13, the TGPS server (41) pre-stores the reference station GPS signal (Rgps_−2, Rgps_−1, Rgps_0, Rgps_1, Rgps_2) containing satellite time (T) data and position data (Xr, Yr) measured by a reference station GPS (RGPS) receiver (11) at the private reference station (10) near the satellite time (To). The position data of the reference station GPS signal contains a real position data (Xs, Ys) which has been accurately pre-measured from the reference station when the reference station was established.

In step S14, the TGPS server (41) receives the data of satellite time (T0) and the reference station GPS signals (T−2, Xr−2, Yr−2; T−1, Xr−1, Yr−1; T0, Xr0, Yr0; T1, Xr1, Yr1; T2, Xr2, Yr2; Xs, Ys) containing satellite time (T) data and position data (Xr, Yr), and selects a reference station GPS signal (Rgps_0) corresponding to the satellite time (T0).

In step S16, the TGPS server (41) transforms the position data of the reference station to a local coordinate value from the selected coordinate value (Xr0, Yr0).

In step S18, the GPS coordinate value (Xr0, Yr0) of the satellite time (To) subtracts from the basic coordinate value (Xs, Ys) of the position data of the reference station by selecting the pre-measured position data of the reference station.

In step S20, a correcting value (X'0, Y'0) of the real time at the satellite time (To) is calculated based on the selected reference station GPS signal (Rgps_0) and the stored actual position data (Xs, Ys) of the reference station.

In step S21, the central control server (42) transforms the position coordinate value (Xm0, Ym0) of the moving station received from the wireless modem (32) of the moving station to a local coordinate value.

In step S22, the position coordinate value (Xm0, Ym0) of the selected GPS signal of the moving station is subtracted from the received correcting value (X'0, Y'0) of the real time at the satellite time (To).

In step S24, an actual position (Xcm0, Ycm0) of the moving station is calculated based on the correcting value and the position data of the moving station.

Finally, in step S26, an actual position (Xcm0, Ycm0) of the moving station is transformed to an accurate local position coordinate value.

A local coordinate system is a practical coordinate being transformed from the GPS signal. Because the GPS coordinate system uses global coordinates, it is not suitable to position a moving station in a relatively narrow local area.

The TGPS system of the present invention is designed to apply to a relatively narrow local area within a range of 2 Kilometers. If position data are transformed to a local coordinate system being controlled by a control server, it is convenient to directly use the position coordinate data to the terminal operating site. The transformed data for the local area are displayed on a mapping screen of the operating site at the corresponding position.

Figure 6:
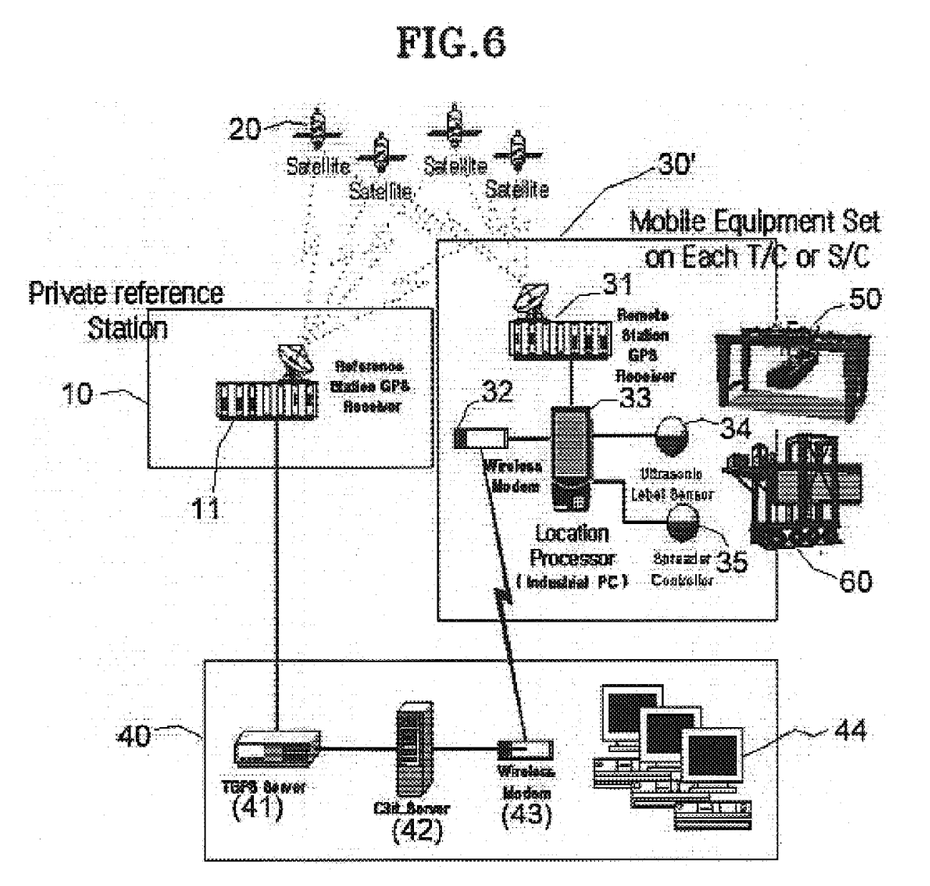
FIG. 6 is a terminal global positioning system employing a real time self differential global positioning system (DGPS) of the present invention.

As shown in FIG. 6, an application of the GPS system applied to a terminal is illustrated for positioning containers and container transporting equipment in the terminal site. For example, it is necessary to control the prime mover or yard equipment such as a traveling crane (T/C) (50) or straddle carrier (S/C) (60) required for loading or unloading at the harbor through a monitor (44) operated by the supersonic label sensor (34). To control the equipment, a job control signal being issued by the control server (42) of the central control unit (40) is transmitted through the wireless modems (43, 32) to the job processor (33) of the mobile equipment set (30') and performed by a spreader controller (35).

At the terminal site, the TGPS is operated for controlling and watching the job performance under the client circumstance with a wireless LAN network and server without the additional receiving-transmitting equipment. Each of the units has a wireless communicating system (modem) for transmitting and receiving the position data and job control data. This TGPS system does not require the expensive ultra-high frequency transmitting-receiving equipment used in the conventional DPGS system. Because this TGPS system is applied to a relatively narrow area within several kilometers, it is aimed at positioning the moving station via the control server rather than the client positioning via the GPS navigating system.

The TGPS system mainly aims to position the moving stations through the control server. The control server is able to position the moving stations for the following cases:

(1) A necessary data, including the GPS position data, is transmitted to the server when a moving station is requested to perform a specific job.

(2) When a server needs to position a specific moving station, the current GPS position data of the specific moving station is requested to transmit through a special message, and the current GPS position is identified by the response of the specific moving station.

(3) If a moving station is needed to identify its current position, the moving station enables it to identify its present position by transmitting its GPS position data to the server through a special message.

A code of the job control data used for transmitting data comprises a string message with a header and a separator (-)
For example: (1) AAA-GPS-2-3-...

(2) ABB-JOBS-JobA-...
wherein "AAA" or "ABB" represents a header, and "-" represents a separator.

In the examples, the string of position data are interpreted that "AAA" or "ABB" represents a header, after a first separator "-" represents a GPS number, sequentially after the second separator "-" represents a local coordinate value. In the example (2), the string of position data is interpreted that a job control data "JOBS" follows after the first separator "-".

While the present invention has been described in detail with its preferred embodiments, it will be understood that further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. A method of terminal Global Positioning System (TGPS) adopting a real-time self Differential Global Positioning System (DGPS) in a local area consisted of a private reference station (10) which has been accurately pre-measured to provide its precise location, the private reference station (10) including a reference station Global Positioning System (GPS) receiver (11) for detecting position via satellites (20~23), a moving station (30) including a moving station GPS receiver (31) for detecting position via satellites, and a first wireless modem (32) for transmitting Reference Global Positioning System (RGPS) signals containing position data and satellite time data from the moving station GPS receiver (31), a central control unit (40) including a TGPS server (41), a central control server (42) and a second wireless modem (43) for communicating with the first wireless modem (32) over a short distance, the TGPS server (41) interfacing with the reference station GPS receiver (11), receiving the RGPS signals from the reference station, calculating correction data (X'0, Y'0) from the received data, and transmitting the calculated correction data to the central control server (42), the central control server (42) interfacing with the second wireless modem (43), receiving the RGPS signals from the moving station, and calculating the real position of the moving station by correcting the error from the RGPS signals of position data received from the moving station, and a job control data and position data codifying with string, header and separator, the TGPS comprises the processing steps of:

receiving a moving station GPS signal (Mgps_0) at the central control server (42), said moving station GPS signal (Mgps_0) containing data of satellite time (T0) and moving station position (Xm0, Ym0) which are measured via the moving station GPS receiver (MGPS) (31) at a specific position and time, transmitting said data of satellite time (T0) from the moving station GPS signal to the TGPS receiver (41), receiving reference station GPS signals (Rgps_-2, Rgps_-1, Rgps_0, Rgps_1, Rgps_2) at the TGPS server (41), said reference station GPS signals containing satellite time (T0) data and position data (Xr, Yr) which are measured via the RGPS receiver (11) at the private reference station (10) near to said satellite time (T0), transforming the position data (Xr, Yr) of the private reference station (10) to a local coordinate value from the selected coordinate value (Xr0, Yr0) by the TGPS server (41), selecting a position data (Xr0, Yr0) of the reference station GPS signal corresponding to said satellite time (T0), calculating a correcting value (X'0, Y'0) according to said selected reference station GPS signal (Rgps_0) and stored actual position data (Xs, Ys) of the reference station at the central control server (42), transforming the position coordinating value (Xm0, Ym0) of moving station received from the wireless modem (32) of moving station to a local coordinating value by the central control server (42), calculating an error-corrected real position (Xcm0, Ycm0) of said moving station according to said correcting value and the position data of the moving station at the central control server (42), and transforming an actual position (Xcm0, Ycm0) of the moving station to an accurate local position coordinating value by the central control server (42).

* * * * *